United States Patent [19]

Sakurai et al.

[11] Patent Number: 4,515,208

[45] Date of Patent: May 7, 1985

[54] AIR CONDITIONING SYSTEM

[75] Inventors: Yukio Sakurai, Atsugi; Akihiko Yamamoto, Yokohama, both of Japan

[73] Assignee: Nissan Motor Company, Limited, Yokohama, Japan

[21] Appl. No.: 343,471

[22] Filed: Jan. 28, 1982

[30] Foreign Application Priority Data

Feb. 12, 1981 [JP] Japan .................................. 56-19329

[51] Int. Cl.³ .......................... F28F 27/02; B60H 3/00; B61D 27/00
[52] U.S. Cl. ..................................... 165/43; 165/103; 165/42; 237/12.3 A; 137/625.28; 98/2.05
[58] Field of Search ...................... 165/43, 103, 42, 35, 165/25, 96, 41; 237/12.3 A, 12.3 B; 137/625.28, 625.29; 98/2.05

[56] References Cited

U.S. PATENT DOCUMENTS

| | | | |
|---|---|---|---|
| 3,916,988 | 11/1975 | Matsuda | 165/96 |
| 4,227,569 | 10/1980 | Wattin | 165/42 |
| 4,267,880 | 5/1981 | Jacquet | 165/41 |
| 4,356,965 | 11/1982 | Matsushima et al. | 165/43 |
| 4,406,214 | 9/1983 | Sakurai | 237/12.3 A |

FOREIGN PATENT DOCUMENTS

| | | | |
|---|---|---|---|
| 59315 | 8/1973 | Japan | 98/2.05 |
| 123520 | 9/1980 | Japan | 165/43 |
| 8713 | 1/1981 | Japan | 237/12.3 A |

Primary Examiner—William R. Cline
Assistant Examiner—John K. Ford
Attorney, Agent, or Firm—Lane, Aitken & Kananen

[57] ABSTRACT

An air conditioning system comprising a duct structure, an evaporator unit positioned downstream of an air inlet end of the duct structure, an air heater unit positioned downstream of the evaporator unit, an air entrance chamber formed between the evaporator unit and the air heater unit, an air distribution chamber formed between the air heater unit and an air outlet end of the duct structure, an air-flow proportioning door positioned between the air entrance chamber and the air heater unit and movable between a position fully shutting of a flow of air from the air entrance chamber to the air heater unit and a position allowing the air heater unit to be fully open to the air entrance chamber, a bypass passageway bypassing the air heater unit, an air-flow guide vane positioned aside the bypass passageway and movable between a position withdrawn from the bypass passageway and a position in the bypass passageway, and a vane drive mechanism intervening between the air-flow proportioning door and the air-flow guide vane and operative to translate the movement of the proportioning door between the two positions thereof into the movement of the two positions, respectively, of the guide vane.

3 Claims, 3 Drawing Figures

AIR CONDITIONING SYSTEM

FIELD OF THE INVENTION

The present invention relates generally to air conditioning systems and particularly to an air conditioning system for installation in a vehicle such as an automotive vehicle.

SUMMARY OF THE INVENTION

In accordance with the present invention, there is provided an air conditioning system comprising, in combination, a duct structure having at least one air inlet end and at least one air outlet end; a refrigerant evaporator unit positioned downstream of the air inlet end thereof; an air heater unit positioned downstream of the evaporator unit; the duct structure having a wall portion formed with an air entrance chamber between the evaporator unit and the air heater unit and a wall portion formed with an air distribution chamber between the air heater unit and the air outlet end of the duct structure; an air-flow proportioning door positioned between the air entrance chamber and the air heater unit and angularly movable about an axis fixed in the duct structure between a first angular position fully shutting of a flow of air from the air entrance chamber to the air heater unit and a second angular position allowing the air heater unit to be fully open to the air entrance chamber, the duct structure further having a wall portion formed with a bypass passageway leading from the air entrance chamber to the air distribution chamber and bypassing the air heater unit; an air-flow guide vane positioned aside the bypass passageway and movable between a first limit angular position withdrawn from the bypass passageway and a second limit angular position moved into the bypass passageway; and vane drive means intervening between the air-flow proportioning door and the air-flow guide vane and operative to translate the movement of the air-flow proportioning door between the first and second angular positions thereof into the movement of the first and second limit angular positions, respectively, of the guide vane.

BRIEF DESCRIPTION OF THE DRAWINGS

The features of an air conditioning system according to the present invention will be more clearly understood from the following description taken in conjunction with the accompanying drawings in which.

DESCRIPTION OF THE PRIOR ART

Figure 1:
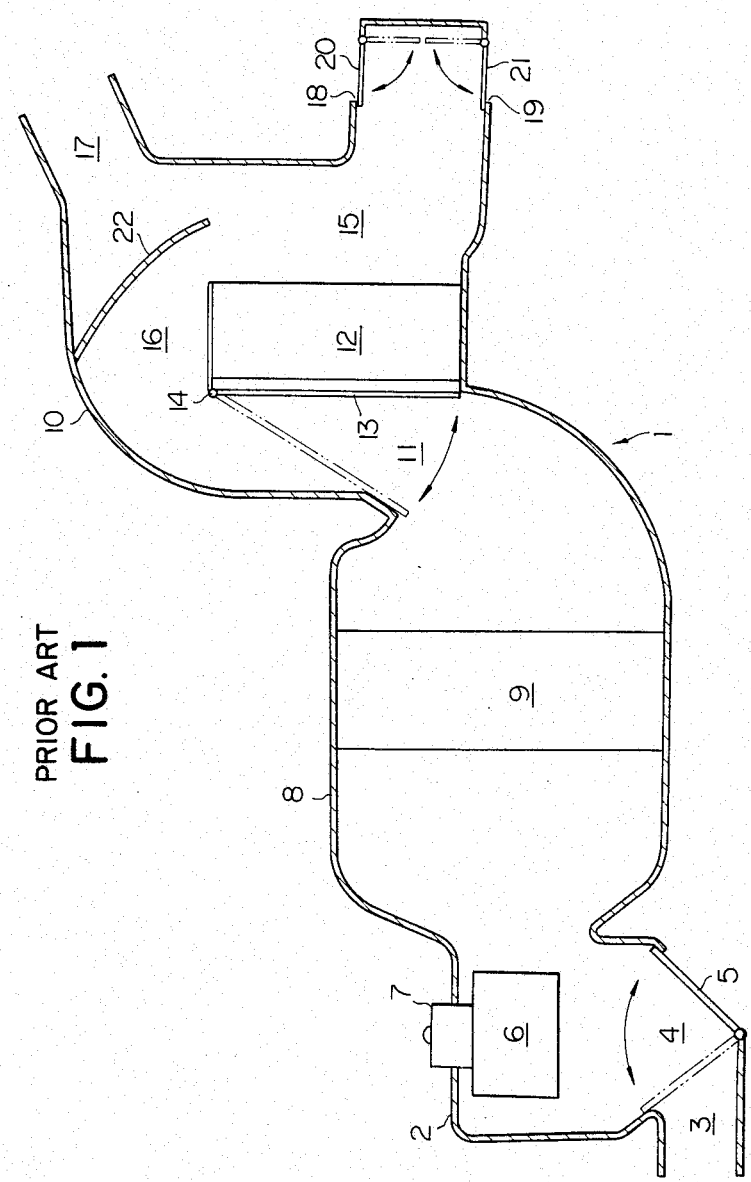
FIG. 1 is a schematic sectional view of the mechanical arrangement of a known automotive air conditioning system of the nature to which the present invention appertains.

Referring to FIG. 1, a known automotive air conditioning system comprises an air conditioner assembly 1 having an air conditioner duct structure which includes an air intake box portion 2 formed with a fresh air intake 3 and a recirculated air intake 4. In the air intake box portion 2 is provided an intake air shift door 5 which is movable between an angular position allowing the fresh air intake 3 to be fully open and closing the recirculated air intake 4 and an angular position closing the air intake 3 and allowing the recirculated air intake to be fully open. The shift door 5 is movable between these two positions and regulates entry of fresh or recirculated air into the box portion 2 through the fresh air intake 3 or the recirculated air intake 4. The atmospheric air entering the air intake box portion 2 is forced into the duct structure by an air-intake blower 6 positioned downstream of the air intake box portion 2. The air-intake blower 6 may be of the variable-speed type driven by an electric motor 7.

The duct structure of the air conditioner assembly 1 further includes an evaporator housing portion 8 having provided therein a refrigerant evaporator unit 9 which is positioned downstream of the air intake blower 6. The evaporator unit 9 is adapted to convert a refrigerant fluid into a gaseous state to extract heat of evaporation from the flow of air passed therethrough and forms part of a refrigeration system which further comprises an engine-driven refrigerant compressor unit (not shown) having a suction port communicating with the refrigerant discharge end of the evaporator unit 9.

The duct structure further includes an air distribution housing portion 10 having formed therein an air entrance chamber 11 which is located on the leftward side of the evaporator unit 9. In the air entrance chamber 11 is provided an air heater unit 12 positioned downstream of the air entrance chamber 11 and an air-flow proportioning door 13 disposed between the evaporator unit 9 and the heater unit 12. The air-flow proportioning door 13 is rotatable with a shaft 14 journaled to the housing portion 10 and is rockable about the shaft 14 between a first angular position to shut off the flow of air from the air entrance chamber 11 to the heater unit 12 as indicated by full lines and a second angular position to induct the flow of air from the entrance chamber 11 totally to the heater unit 12 as indicated by dot-and-dash lines. The proportioning door 13 is continuously movable between these two angular positions about the shaft 14 and is operative to regulate the proportion in which the cooled air delivered from the refrigerant evaporator unit 9 into the air entrance chamber 11 is to be passed through the heater unit 12.

The air distribution housing portion 10 is further formed with an air distribution chamber 15 which is located downstream of the air entrance chamber 11 partially across the heater unit 12 and partially aside from the heater unit 12. Thus, the housing portion 10 has a bypass passageway 16 leading from the air entrance chamber 11 to the air distribution chamber 15 and bypassing the air heater unit 12. The air-flow proportioning door 13 is thus adapted to regulate the proportion between the flow rate of air to be passed from the air entrance chamber 11 to the air distribution chamber 15 through the heater unit 12 and the flow rate of air to be passed from the air entrance chamber 11 to the air distribution chamber 15 through the above mentioned bypass passageway 16. When the air-flow proportioning door 13 is held in an angular position intermediate between the above mentioned first and second angular positions thereof about the shaft 14, the air cooled by the evaporator unit 9 is passed from the air entrance chamber 11 to the air distribution chamber 15 partially through the heater unit 12 and partially bypassing the heater unit 12. The air passed through and heated by the heater unit 12 is mixed in the air distribution chamber 15 with the cooled air passed through the bypass passageway 16, producing in the air distribution chamber 15 a draft of air with a temperature dictated by the proportion between the draught volumes of air past the air-flow proportioning door 13. The duct structure of the air conditioner assembly 1 further has air outlets 17, 18 and 19 communicating with, for example, instrument panel ventilation ducts, windshield defroster nozzles, and floor ventilation nozzles (not shown), respectively. The draught volumes of the air to be distributed from the air distribution chamber 15 to the defroster nozzles and floor ventilation nozzles through the air outlets 18 and 19 are regulated by draught control doors 20 and 21, respectively.

Between the air entrance chamber 11 and the air distribution chamber 15 is provided an air-flow guide vane 22 secured to the wall of the air distribution housing portion 10. The air-flow guide vane 22 is disposed on one side of the heater unit 12 as shown and is adapted to forcibly direct air from the air entrance chamber 11 to the air distribution chamber 15.

The air-flow guide vane 22 thus securely connected to the housing portion 10 forms a hindrance to the passage of air through the bypass passageway 16 when, especially, the air-flow proportioning door 13 is held in the first angular position thereof fully closing the inlet to the heater unit 12. This not only gives rise to a decrease in the maximum ventilation efficiency of the air conditioner assembly 1 but is responsible for production of noises due to the resistance imparted to the draft of air impinging upon the guide vane 22 from the air entrance chamber 11. The present invention contemplates solution of these problems encountered in an air conditioning system using an air-flow guide vane in the air conditioner assembly incorporated therein.

DESCRIPTION OF THE PREFERRED EMBODIMENT

Figure 2:
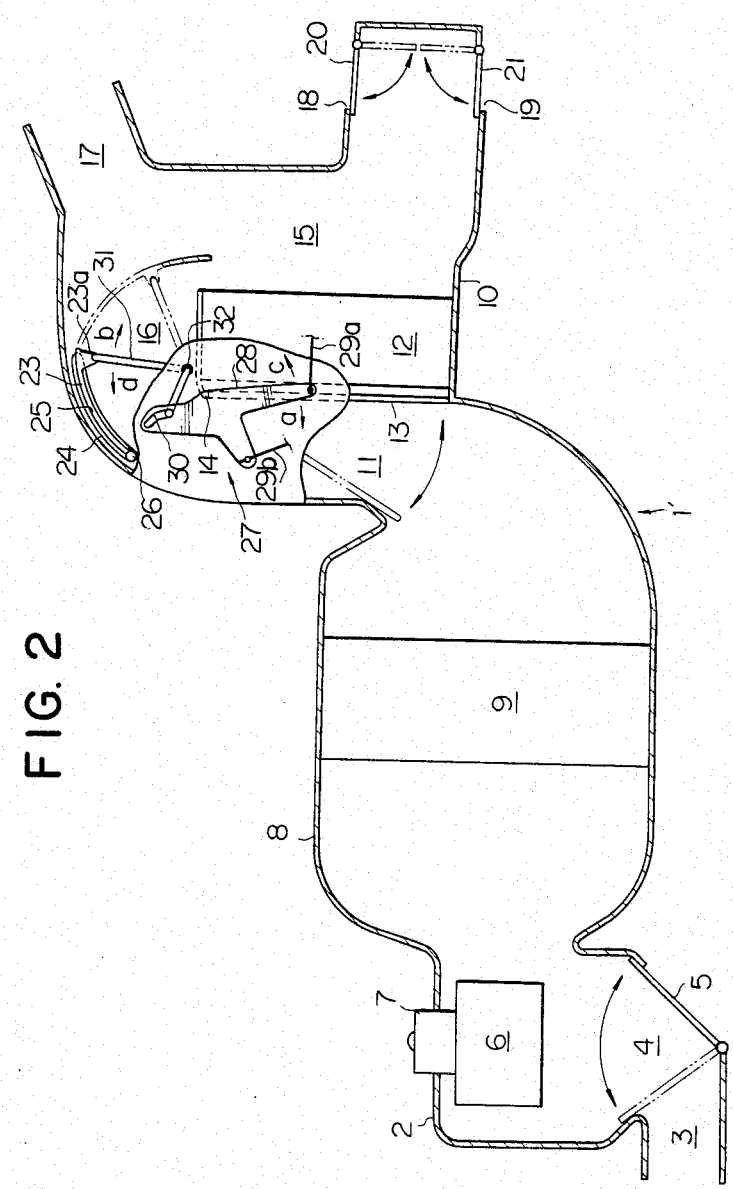
FIG. 2 is a view similar to FIG. 1 but shows a preferred embodiment of an air conditioning system embodying the present invention.

Referring to FIG. 2 of the drawings, a preferred embodiment of an air conditioning system according to the present invention comprises an air conditioner assembly 1' which is shown, by way of example, as being generally similar in construction to the prior-art air conditioner assembly 1 described above with reference to FIG. 1. Thus, the counterparts of the members, portions and units of the air conditioner assembly 1 shown in FIG. 1 are designated by like reference numerals in FIG. 2.

In the air conditioner assembly 1' shown in FIG. 2, an air-flow guide vane 23 is provided intermediate between the air entrance chamber 11 and the air distribution chamber 15 and is disposed on one side of the air heater unit 12. The air-flow guide vane 23 is movable along a vane guide member 24 securely attached to the inner wall of the housing portion 10 by suitable fastening means (not shown). The vane guide member 24 is formed with a slot 25 which is arcuately curved about an axis fixed with respect to the housing portion 10 and parallel with the center axis of the shaft 14 about which the air-flow proportioning door 13 is angularly movable. The arcuately curved slot 25 has a first end 25a closer to the air entrance chamber 11 than to the air distribution chamber 15 and a second end 25b located closer to the air distribution chamber 15 than to the air entrance chamber 11. The guide vane 23 is arcuately curved in conformity to the slot 25 and has a a slider pin 26 projecting from and securely connected to one side end of the vane 23 and parallel with the shaft 14 of the air-flow proportioning door 13. The slider pin 26 has an axial portion received in the slot 25 in the vane guide member 24 and is thus movable with the pin 26 along the slot 25. The guide vane 23 is thus angularly movable about the above mentioned axis between a first limit angular position withdrawn from the bypass passageway 16 between the chambers 11 and 15 and having the slider pin 26 located at the first end 25a of the slot 25 as indicated by solid lines and a second limit angular position moved in its entirety into the bypass passageway 16 and having the pin 26 located at the second end 25b of the slot 25 as indicated by dot-and-dash lines. The guide vane 23 has an end portion 23a closer to the second end 25b than to the first end 25a of the slot 25 as shown.

The air conditioning system embodying the present invention further comprises a vane drive mechanism 27 to drive the air-flow guide vane 23 continuously between the above mentioned two limit angular positions thereof. The vane drive mechanism 27 comprises a control lever 28 having a fulcrum portion securely mounted on the shaft 14 of the air-flow proportioning door 13. The control lever 28 is thus rotatable with the air-flow proportioning door 13 about the center axis of the shaft 14 and further has first, second and third arm portions 28a, 28b and 28c which are angularly spaced apart from each other about the center axis of the shaft 14. The first and second arm portions 28a and 28b are operatively connected to a suitable door-position control device (not shown) through suitable mechanical linkages 29a and 29b, respectively. The door-position control device is adapted to drive the air-flow proportioning door 13 for angular motion about the center axis of the shaft 14 between predetermined first and second angular positions holding the door 13 in the first and second angular positions, respectively, thereof so as to regulate the proportion between the draught of air to be passed through the air heater unit 12 and the draught of air to bypass the heater unit 12. The third arm portion 28c of the control lever 28 extends toward the guide member 24 and is formed with a shallowly V-shaped slot 30.

The vane drive mechanism 27 further comprises a generally L-shaped bell-crank lever 31 having an intermediate fulcrum portion rotatably mounted on a shaft 32 having a center axis aligned with the above mentioned axis about which the air-flow guide vane 23 is angularly movable with respect to the vane guide member 24. The bell-crank lever 31 has first and second arm portions 31a and 31b which are angularly spaced apart from each other about the center axis of the shaft 32. The first arm portion 31a of the bell-crank lever 31 is partially bent and slidably received in the slot 30 in the third arm portion 28c of the control lever 28. The second arm portion 31b of the bell-crank lever 31 is pivotally connected at its leading end to the end portion 23a of the guide vane 23 across the bypass passageway 16. The connection thus provided between the guide vane 23 and the control lever 28 through the bell-crank lever 31 is such that the guide vane 23 is held in the previously mentioned first and second limit angular positions thereof when the control lever 28 is held in the first and second angular positions, respectively, thereof with respect to the air heater unit 12.

When the control lever 28 is held in the first angular position thereof about the axis of the shaft 14, the air-flow proportioning door 13 is also held in the first angular position thereof about the shaft 14 and fully shuts off the flow of air from the evaporator unit 9 to the air heater unit 12. Under these conditions, the air-flow guide vane 23 is maintained in the first limit angular position thereof with respect to the vane guide member 24 with the slider pin 26 located at the first end 25a of the arcuately curved slot 25 in the guide member 24 as indicated by the solid lines in FIGS. 2 and 3. The air-flow guide vane 23 is, thus, almost completely withdrawn from the bypass passageway 16 so that the flow of air from the air entrance chamber 11 to the air distribution chamber 15 encounters no obstacle therebetween.

When the control lever 28 is thereafter driven to turn from the first angular position thereof in a direction indicated by arrow a in FIGS. 1 and 2 about the center axis of the shaft 14, the air-flow proportioning door 13 is also caused to turn from the first angular position thereof about the center axis of the shaft 14 as indicated by arrow a'. As a consequence, the air heater unit 12 is allowed to be open to the air entrance chamber 11 to an extent which is dictated by the angle through which the door 13 is turned with respect to the heater unit 12. As the control lever 28 is thus turned away from the first angular position thereof with respect to the air heater unit 12, the first arm portion 31a of the bell-crank lever 31 has its bent leading end displaced within the slot 30 in the third arm portion 28c of the control lever 28 and is caused to turn in its entirety in a direction indicated by arrow b about the center axis of the shaft 32. The turning motion of the bell-crank lever 31 is transmitted through the second arm portion 31b thereof to the air-flow guide vane 23, which is consequently driven to angularly move with respect to the vane guide member 24 from the first limit angular position thereof about the center axis of the shaft 32 as indicated by dot-and-dash lines in FIG. 3. The guide vane 23 is thus caused to move in an arc into the bypass passageway 16 with the slider pin 26 displaced away from the first end 25a toward the second end 25b of the slot 25 in the vane guide member 24. The flow of air to be blown into the air distribution chamber 15 from the air entrance chamber 11 is thus facilitated to enter the air distribution chamber 15 past the bypass passageway 16 and is mixed at an increased efficiency with the flow of air passed through and heated by the air heater unit 12. When the control lever 28 is turned into the second angular position about the center axis of the shaft 14, the air-flow proportioning door 13 is held in its second angular position allowing the air heater unit 12 to be fully open to the air entrance chamber 11 and fully blocking the communication between the air entrance chamber 11 and the bypass passageway 16 as indicated by dot-and-dash lines in FIGS. 2 and 3. The air-flow guide vane 23 now assumes the second limit angular position thereof with respect to the vane guide member 24 with the slider pin 26 located adjacent the second end 25b of the slot 25 in the guide member 24 as will be seen from the illustration by dot-and-dash lines in FIG. 2.

Figure 3:
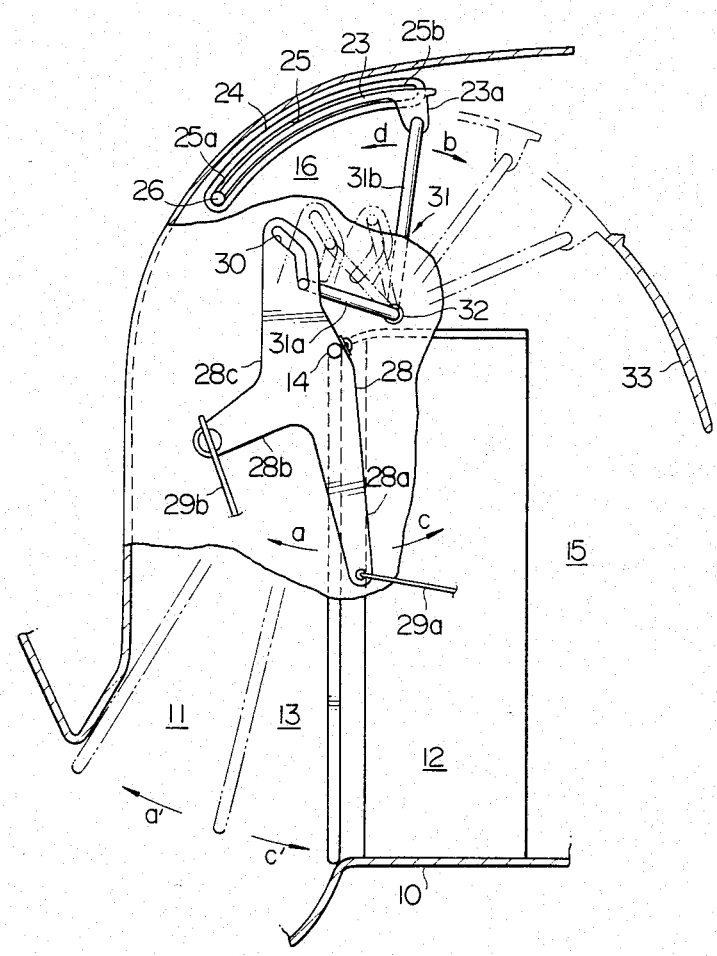
FIG. 3 is a fragmentary sectional view showing, to an enlarged scale, important portions of the embodiment illustrated in FIG. 2.

If desired, a suitable stationary guide vane 33 may be additionally provided as shown in FIGS. 2 and 3 so as to enable a flow of air to be guided over an increased distance between the air entrance and air distribution chambers 11 and 15. The additional stationary guide vane 33 is secured to the inner wall of the housing portion 10 and extends from the bypass passageway 16 toward the air distribution chamber 15. The stationary guide vane 33 is arranged so that the air-flow guide vane 23 has its end portion 23a brought into engagement with the additional guide vane 33 and thus becomes continuous to the guide vane 23 as indicated by dot-and-dash lines in FIGS. 2 and 3 when the guide vane 23 is turned into the second limit angular position thereof. The additional guide vane 33 is preferably arranged in such a manner as to extend arcuately from the end portion 23a of the air-flow guide vane 23 toward the air distribution chamber 15 as shown when the guide vane 23 is thus brought into engagement with the additional guide vane 33.

If the control lever 28 is thereafter driven to turn backwardly from the second angular position toward the first angular position thereof about the center axis of the shaft 14 as indicated by arrow c in FIGS. 2 and 3, the air-flow proportioning door 13 is also caused to turn backwardly from the second angular position toward the first angular position thereof with respect to the air heater unit 12 as indicated by arrow c'. The air-flow proportioning door 13 thus allows the air entrance chamber 11 to communicate with the air distribution chamber 15 not only through the air heater unit 12 but through the bypass passageway 16 and thereby reduces the degree to which the heater unit 12 is allowed to be open to the air entrance chamber 11. As the control lever 28 is thus turned backwardly toward the first angular position thereof, the first arm portion 31a of the bell-crank lever 31 has its bent leading end displaced toward its initial locality in the slot 30 in the control lever 28 and is caused to turn about the shaft 32 in a direction indicated by arrow d in FIGS. 2 and 3. It therefore follows that the air-flow guide vane 23 is caused to move backwardly from the second limit angular position toward the first limit angular position thereof with respect to the vane guide member 24 and to accordingly withdraw away from the air distribution chamber 15.

The slot 30 formed in the third arm portion 28c of the control lever 28 is shaped in such a manner that angular movement of the control lever 28 through a predetermined angle from or to its angular position correspondig to the first angular position thereof causes angular movement of the bell-crank lever 31 through a larger angle from or to its angular position having the air-flow guide vane 23 held in the first limit angular position thereof. Accordingly, the bell-crank lever 31 is enabled to turn faster or through a larger angle about the center axis of the shaft 32 than the control lever 28 and accordingly the air-flow proportioning door 13 are turned about the center axis of the shaft 14 during an incipient stage after the control lever 28 and the air-flow proportioning door 13 are initiated into actions to turn from the respective first angular positions thereof and during a final stage before the control lever 28 and accordingly the air-flow proportioning door 13 are being turned toward the respective first angular positions thereof. For this reason, the air-flow guide vane 23 actuated to move away from the first limit angular position with respect to the vane guide member 24 is enabled to move faster into a certain intermediate angular position between the first and second limit angular positions thereof during an incipient stage of the turning motion than during the subsequent or remaining stage in which the guide vane 23 is being moved from the certain intermediate angular position toward the second limit angular position thereof. On the other hand, the air-flow guide vane 23 actuated to move away from the second limit angular position with respect to the vane guide member 24 is enabled to move slower into a certain intermediate angular position between the second and first limit angular positions thereof during an incipient stage of the turning motion than during the subsequent or remaining stage in which the guide vane 23 is reaching the first limit angular position thereof. The above mentioned intermediate angular position of the guide vane 23 is dictated by the geometry of the slot 30 or, more specifically, the location of a bent portion of the slot 30 in the third arm portion 28c of the control lever 28.

While it has been assumed that the slot 30 in the third arm portion 28c of the control lever 28 is shaped so that the air-flow guide vane 23 reaches the second limit angular position thereof when the air-flow proportioning door 13 is moved into the second angular position thereof fully shutting off the flow of air to the air heater unit 12, the slot 30 may be otherwise shaped so that the guide vane 23 is permitted to reach the second limit angular position thereof before the air-flow proportioning door 13 reaches the second angular position thereof.

What is claimed is:

1. An air conditioning system comprising in combination:
    a duct structure having at least one air inlet end and at least one air outlet end;
    a refrigerant evaporator unit positioned downstream of the air inlet end thereof;
    an air heater unit positioned downstream of the evaporator unit;
    the duct structure having a wall portion formed with an air entrance chamber between said evaporator unit and said air heater unit and wall portion formed with an air distribution chamber between the air heater unit and said air outlet end of the duct structure;
    an air-flow proportioning door positioned between said air entrance chamber and said air heater unit and angularly movable about an axis fixed in said duct structure between a first angular position fully shutting off a flow of air from the air entrance chamber to the air heater unit and a second angular position allowing the air heater unit to be fully open to the air entrance chamber;
    the duct structure further having a wall portion formed with a bypass passageway leading from the air entrance chamber to the air distribution chamber and bypassing said air heater unit;
    a vane guide member secured to said duct structure and formed with a slot which is arcuately curved about an axis fixed in the duct structure,
    an air-flow guide vane positioned aside said bypass passageway and arcuately curved in conformity to said slot of said vane guide member, the arcuately curved guide vane being movable between a first limit angular position withdrawn from the bypass passageway and a second limit angular position moved into the bypass passageway;
    a stationary guide vane positioned downstream of said air heater unit and arcuately curved and extending from said bypass passageway toward said air distribution chamber, the stationary guide vane having a corresponding edge thereof with said air-flow guide vane when the air-flow guide vane is held into abutment with said stationary guide vane, and
    vane drive means intervening between said air-flow proportioning door and said air-flow guide vane and operative to translate the movement of the air-flow proportioning door between the first and second angular positions thereof into the movement of the first and second limit angular positions, respectively, of the guide vane, said vane drive means comprising a control lever angularly movable with said air-flow proportioning door about said axis, and a bell-crank lever angularly movable about an axis fixed in said duct structure and substantially parallel with the axis about which the air-flow proportioning door is angularly movable, the bell-crank lever being pivotally connected to said control lever and to said air-flow guide vane.

2. An air conditioning system as set forth in claim 1, in which said control lever is formed with slot means through which said bell-crank lever engages with the control lever.

3. An air conditioning system as set forth in claim 2, in which said slot means in the control lever is shaped so that angular movement of the control lever through a predetermined angle from or to its angular position corresponding to the first angular position thereof causes angular movement of the bell-crank lever through a larger angle from or to its angular position having the air-flow guide vane held in the first limit angular position thereof.

* * * * *